Patented Jan. 29, 1946

2,393,844

UNITED STATES PATENT OFFICE 2,393,844

POLISHING COMPOSITION

Blanche C. Van Valkenburgh, New York, N. Y.

No Drawing. Application October 19, 1943,
Serial No. 506,863

2 Claims. (Cl. 106—3)

This invention relates to polishing compounds and relates particularly to an aqueous polishing compound which is especially suitable for the polishing of metal and metallic objects.

For many purposes it is desirable that metal and other finished objects shall be kept polished with a bright surface and many attempts have been made to develop polishing compounds which will yield a bright surface with a minimum of damage to the article treated. To the present, most polishing compounds contain either corrosive substances such as acids, or hard abrasives, both of which are harmful to the article polished, removing from the surface during the polishing operation undue and highly undesirable quantities of surface material either metal or applied finish.

The present invention presents a new composition of matter which is particularly advantageous for polishing purposes, which contains neither corrosive nor abrasive materials, yet yields an excellent polish upon all sorts of smooth surfaces.

Broadly, the composition of matter of the invention consists of an aqueous liquid containing zinc oxide and lime water.

Thus the composition of matter of the invention provides a new and useful surface polishing material which is free from abrasive material and free from corrosive materials. Other objects and details of the invention will be apparent from the following description:

In preparing the polish of the invention, I prepare a concentrated solution of calcium hydrate, better known as lime water, which may, if desired, contain small quantities of undissolved calcium hydrate. To this mixture I then add a substantial quantity of zinc oxide, preferably in moderately fine particle form. Satisfactory proportions may range from an amount of lime in the lime water slightly below saturation, to a lime water containing in suspension a substantial amount of undissolved calcium hydrate; with an amount of zinc oxide ranging from one-sixth to one-half of the weight of lime water.

The preferred embodiment of the invention consists of a composition of matter prepared according to the following recipe:

Saturated lime water_____ounces (liquid)\_\_ 60
Commercial zinc oxide\_\_ounces (by weight)\_\_ 16

In preparing the composition of matter of the present invention, the desired amount of cold water is taken, which, in the above formula, is approximately sixty ounces, and to it is added approximately one-eighth to one-quarter ounces of calcium hydrate which may be added as hydrated lime or as fresh quick-lime without any particular preference. The lime is stirred vigorously into the water and the stirring is repeated at intervals, until as much as possible of the lime is dissolved. The clear lime water may be decanted from the undissolved residue, if desired, or the lime water solution with the residue of undissolved solid may be used as such. When the lime is reasonably nearly dissolved to saturation in the water, the zinc oxide is added, again with vigorous stirring, until a homogeneous suspension is obtained. The material is then packaged in suitable containers; the composition being stirred vigorously during the packaging to make sure that the zinc oxide remains in suspension so that the several packages contain approximately the same proportion of zinc oxide.

The mixture may be stored indefinitely, especially if protected against atmospheric carbon dioxide, which, if the container is allowed to stand open too long, may precipitate an undue portion of the calcium hydrate.

For use, the container is shaken vigorously to renew the suspension of zinc oxide in the lime water and a portion is applied to a rag and rubbed upon the surface to be polished. Moderately vigorous rubbing produces an excellent polish upon all kinds of smooth surfaces and the polish remains for very long periods of time.

In the case of silver, copper and brass articles polished by this polishing composition, they may be set aside and if unused, the polish may remain unchanged for many months or years. In fact, the composition of matter yields a polish which is far more enduring than is obtainable with any other polishing compound.

Why the polish should be so enduring is as yet wholly unknown, but the chemistry of the matter suggests the possibility that a very thin adherent layer of zinc hydroxide is produced upon the polished surface; and that this layer is sufficiently adherent and sufficiently impervious to atmospheric influences to protect the underlying metal from atmospheric oxidation, sulfurization, corrosion or other harmful influence which would tend to destroy the polished surface. However, the protective layer is so thin that it is impossible to obtain a chemical analysis and therefore the exact method of operation is as yet unknown.

*Example 1*

A silver cup was polished with the polishing composition as above described to a bright, smooth polish. The polished silver cup was then set aside in a china cupboard which was opened practically every day. The cup was not touched and at the end of a year, the polish was, as far as could be determined by visual inspection, as good as the day the cup was set in the china cupboard. At the same time a similar silver cup was polished by an ordinary, good abrasive silver polish as purchased on the open market, and at the end of a year the cup was nearly black from oxidation and sulfur tarnish.

*Example 2*

A copper plaque mounted upon a varnished wood base was polished all over with the composition of matter of the present invention, and the plaque was hung upon the wall and dusted carefully at occasional intervals. At the end of six months, the copper plaque retained as nearly as could be determined by visual inspection its original polish.

Thus the polish of the invention yields a bright polish with a reasonable amount of polishing effort, and retains the polish for much greater lengths of time than any prior polishing compound.

The polish is particularly advantageous for the polishing of jewelry by jewelers, since it is wholly free from any material which can scratch or abrade jewelry. It is particularly advantageous for silversmiths, since it yields a polish upon the silver which is highly advantageous and much more enduring than is obtainable by any other treatment short of lacquering. It is particularly advantageous for household polishing of all types including silverware, metalware generally including plumbing fixtures, electric light fixtures, household hardware generally. It is particularly effective for cleaning piano keys. It is very effective for the cleaning of windows, mirrors and glassware of all types.

In addition, it is an excellent polishing compound for automobiles, both for brass trim, nickel plated trim, chromium plated trim, and the like.

Also this polish is particularly advantageous for articles in daily use such as silverware, both flatware and hollow ware, silver articles generally, and in fact any articles which are regularly in daily use, since it can be used as daily polishing treatments to keep the articles in a condition of high polish.

Thus the invention provides a new, useful, simple and inexpensive composition of matter for polishing purposes generally.

While there is above disclosed but a single embodiment of the composition of matter of the invention, it is possible to provide still other embodiments without departing from the inventive concept herein disclosed and it is therefore desired that only such limitations be imposed on the appended claims as are stated therein or required by the prior art.

The invention claimed is:

1. A polishing composition consisting of a saturated solution of lime water containing therein approximately 16 parts by weight of zinc oxide per 60 parts by fluid measure of the lime water.

2. A polishing composition consisting of a saturated solution of lime water, containing in suspension a substantial amount of undissolved calcium hydrate and containing also zinc oxide in an amount between $1/8$ and $1/2$ of the weight of the lime water.

BLANCHE C. VAN VALKENBURGH.